United States Patent
Tsuchiya et al.

(10) Patent No.: US 12,374,169 B2
(45) Date of Patent: Jul. 29, 2025

(54) VEHICLE CONTROL DEVICE

(71) Applicant: HITACHI ASTEMO, LTD., Hitachinaka (JP)

(72) Inventors: Ryo Tsuchiya, Hitachinaka (JP); Kazuyoshi Serizawa, Hitachinaka (JP); Koji Maeda, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 226 days.

(21) Appl. No.: 18/041,701

(22) PCT Filed: Jun. 14, 2021

(86) PCT No.: PCT/JP2021/022568
§ 371 (c)(1),
(2) Date: Feb. 15, 2023

(87) PCT Pub. No.: WO2022/070525
PCT Pub. Date: Apr. 7, 2022

(65) Prior Publication Data
US 2023/0306796 A1    Sep. 28, 2023

(30) Foreign Application Priority Data
Sep. 30, 2020   (JP) .................. 2020-166384

(51) Int. Cl.
    G07C 5/00    (2006.01)
(52) U.S. Cl.
    CPC .................... G07C 5/008 (2013.01)
(58) Field of Classification Search
    CPC .............. G07C 5/008; H04L 12/66; H04L 2012/40273
See application file for complete search history.

(56) References Cited

U.S. PATENT DOCUMENTS

| | | | | |
|---|---|---|---|---|
| 2005/0021874 | A1* | 1/2005 | Georgiou | G06F 15/167 709/250 |
| 2012/0082171 | A1* | 4/2012 | Georgiou | G06F 15/167 370/466 |

(Continued)

FOREIGN PATENT DOCUMENTS

| | | |
|---|---|---|
| JP | 2013-179539 A | 9/2013 |
| JP | 2020-037387 A | 3/2020 |

OTHER PUBLICATIONS

Dikaiakos et al, M. Location-Aware Services over Vehicular Ad-Hoc Networks using Car-to-Car Commnication, Google Scholar, IEEE Journal on Selected Areas in Communications, vol. 25, No. 8, Oct. 2007, pp. 1590-1602. (Year: 2007).*

(Continued)

*Primary Examiner* — Russell Frejd
(74) *Attorney, Agent, or Firm* — Foley & Lardner LLP

(57) ABSTRACT

The present invention addresses the problem of reducing the processor load of an integrated circuit that processes information aggregated in a zone architecture. A network engine (210) of this vehicle control device receives data containing a plurality of pairs of the information and a source address of the information according to a first communication protocol (Protocol A). The network engine (210) identifies a communication protocol (Protocol B, C) of a communication interface of a destination integrated circuit (SoC 220) corresponding to the source address of each item of the information. The network engine (210) sorts the information for each identified communication protocol, converts the sorted information into data of the identified communication protocol, and transmits each converted data item to the destination integrated circuit via the communication interface of the destination integrated circuit.

4 Claims, 15 Drawing Sheets

(56) References Cited

U.S. PATENT DOCUMENTS

| | | | |
|---|---|---|---|
| 2019/0028294 A1* | 1/2019 | Daher | H04W 4/021 |
| 2019/0058611 A1* | 2/2019 | Maeda | H04L 67/12 |
| 2019/0089555 A1* | 3/2019 | Sugimoto | H04L 12/66 |
| 2019/0394089 A1 | 12/2019 | Barrett et al. | |
| 2020/0125858 A1 | 4/2020 | Bauer et al. | |

OTHER PUBLICATIONS

Bernsen et al, J. Unicast routing protocols for vehicular ad hoc networks: A critical comparison and classification, Google Scholar, Elsevier, Pervasive and Mobile Computing, vol. 5, Iss. 1, Feb. 2009, pp. 1-18. (Year: 2009).*

Kakkasageri et al, M.S. Information management in vehicular ad hoc networks: A review, Google Scholar, Elsevier, Journal of Network and Computer Applications, vol. 39, Mar. 2014, pp. 334-350. (Year: 2014).*

International Search Report with English Translation and Written Opinion of International Application No. PCT/JP2021/022568 dated Aug. 24, 2021.

* cited by examiner (FIRST COMPARATIVE EXAMPLE)

(SECOND COMPARATIVE EXAMPLE)

(FIRST EMBODIMENT)

(MODIFICATION)

(THIRD EMBODIMENT)

(FOURTH EMBODIMENT)

(SEVENTH EMBODIMENT)

FIG. 13
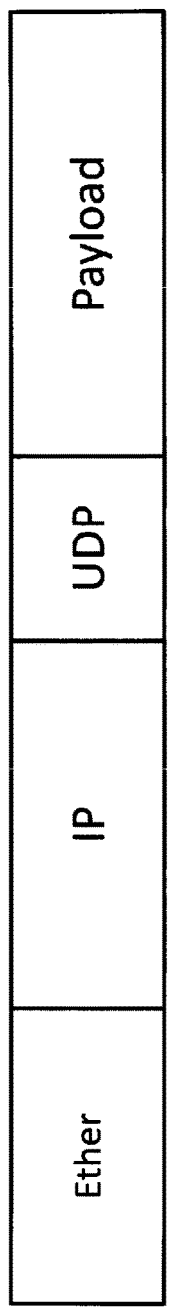
INPUT DATA FRAME
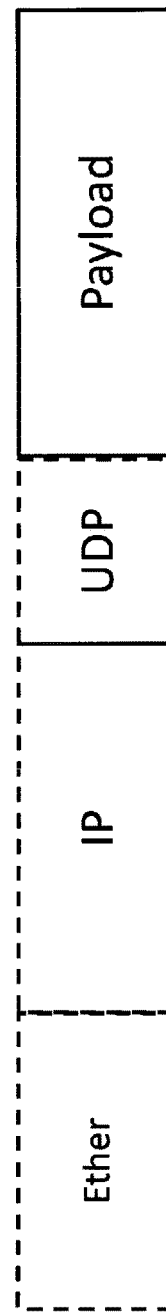
SENSOR DATA
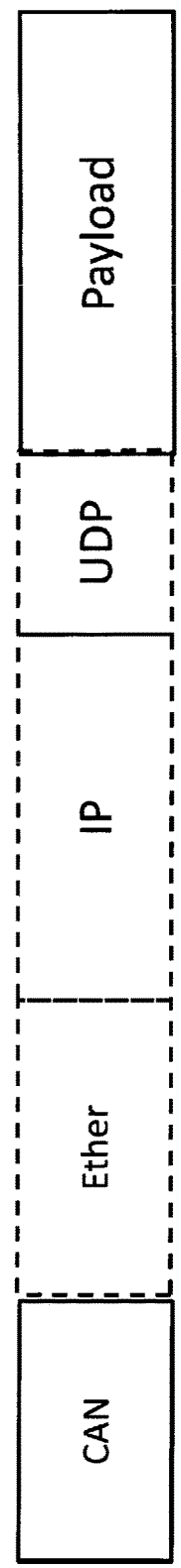
CONTROL DATA FIG. 14A
| No. | PROTOCOL A |
|---|---|
| 1 | Ethernet |
FIG. 14B
| No. | PROTOCOL B |
|---|---|
| 1 | PCIe |
| 2 | MIPI-CSI2 |
FOR CAMERA
FIG. 14C
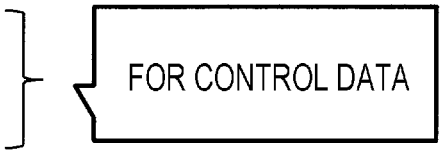
| No. | PROTOCOL C |
|---|---|
| 1 | CAN |
| 2 | SPI |
FOR CONTROL DATA

VEHICLE CONTROL DEVICE

TECHNICAL FIELD

The present invention relates to a vehicle control device.

BACKGROUND ART

In order to reduce the cost of electronic control units (ECUs), the shift to zone architectures is progressing. In zone architectures, software processing is centralized in an integrated ECU, and a zone ECU serves as a network HUB and is connected to sensors and actuators. By integrating ECUs and networks, the number of ECUs and harnesses can be reduced, and the cost can be reduced.

Also known are gateway devices that can ensure that high-speed, large-capacity data communications do not affect communications in a vehicle (see, for example, Patent Literature 1).

CITATION LIST

Patent Literature

PTL 1: JP 2013-179539 A

SUMMARY OF INVENTION

Technical Problem

In zone architectures, unlike conventional domain architectures, networks are integrated across domains. Since it is necessary to simultaneously communicate large volumes of camera data and vehicle control data between the zone ECU and the integrated ECU, low-delay and large-capacity communications are required for the network. Therefore, the application of gigabit-class Ethernet (registered trademark) has been considered.

However, when an in-vehicle microcomputer, which is mounted on an integrated ECU and executes software processing, performs gigabit-class communication processing, there is a problem that the CPU is overloaded just by data distribution between domains, and resources for performing essential software processing are reduced.

In addition, in a gateway device such as disclosed in Patent Literature 1, when data from different domains are aggregated in a zone architecture, the sorting of the aggregated data cannot be performed.

An object of the present invention is to provide a vehicle control device capable of reducing the processor load on an integrated circuit that processes information aggregated in a zone architecture.

Solution to Problem

In order to achieve the above object, a vehicle control device according to an aspect of the present invention includes: at least one integrated circuit that processes information; and a network engine that receives data containing a plurality of pairs of the information and a source address of the information according to a first communication protocol, identifies a communication protocol of a communication interface of a destination integrated circuit corresponding to the source address of each item of the information, sorts the information for each identified communication protocol, converts the sorted information into data of the identified communication protocol, and transmits each converted data item to the destination integrated circuit via the communication interface of the destination integrated circuit.

Advantageous Effects of Invention

According to the present invention, the processor load on an integrated circuit that processes information aggregated in a zone architecture can be reduced. Problems, configurations, and effects other than those described above will be clarified by the following description of embodiments.

BRIEF DESCRIPTION OF DRAWINGS

FIG. 13 is an explanatory diagram of data (input data frame) input to the network engine and data (output frame) output from the network engine.

FIG. 14A illustrates a specific example of Protocol A.

FIG. 14B illustrates a specific example of Protocol B.

FIG. 14C illustrates a specific example of Protocol C.

DESCRIPTION OF EMBODIMENTS

Hereinafter, the configuration and operation of an integrated ECU serving as a vehicle control device according to first to seventh embodiments of the present invention will be described with reference to the drawings. Although details will be described later, the integrated ECU identifies and sorts (separates) data input from Ethernet (protocol defined by IEEE 802.3), and transmits the sorted data from a dedicated interface to a dedicated system-on-a-chip (SoC) or a central processing unit (CPU).

First Comparative Example

Figure 1:
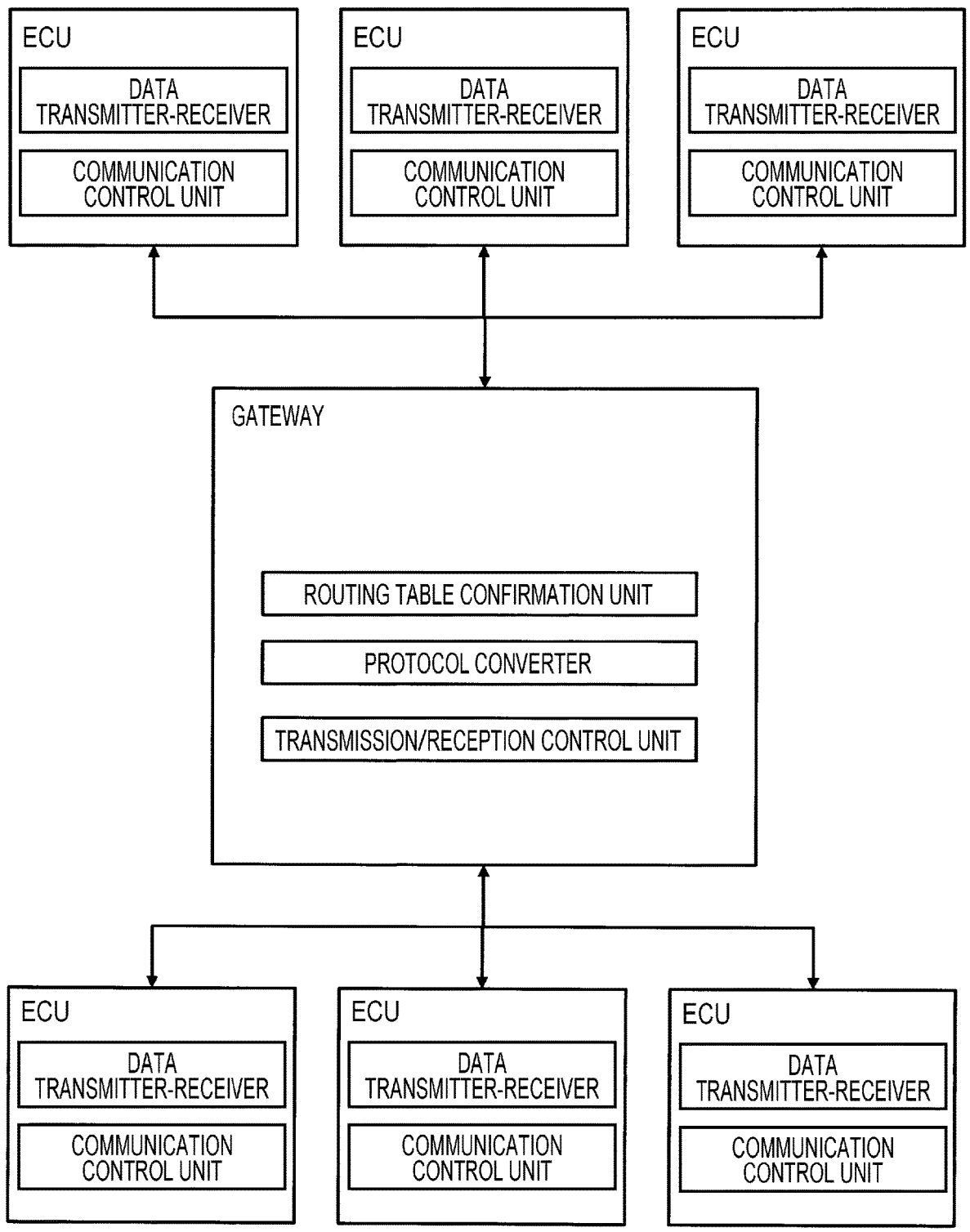
FIG. 1 is a block diagram illustrating the functions of a gateway.

First, as a first comparative example with the present invention, an outline of the functions of a gateway will be described. FIG. 1 is a block diagram illustrating the functions of a gateway.

The gateway is equipped with, for example, a routing table confirmation unit, a protocol converter, and a transmission/reception control unit. The transmission/reception control unit receives data from each ECU. The routing table confirmation unit refers to a routing table to confirm the destination of the received data. The protocol converter converts the received data according to the communication protocol of the destination. The transmission/reception control unit transmits (transfers) the converted data to the confirmed destination.

When data from different domains are aggregated in a zone architecture, normal gateways cannot sort the aggregated data. Note that normal gateways handle only control data and not information data such as cameras.

Second Comparative Example

Figure 2:
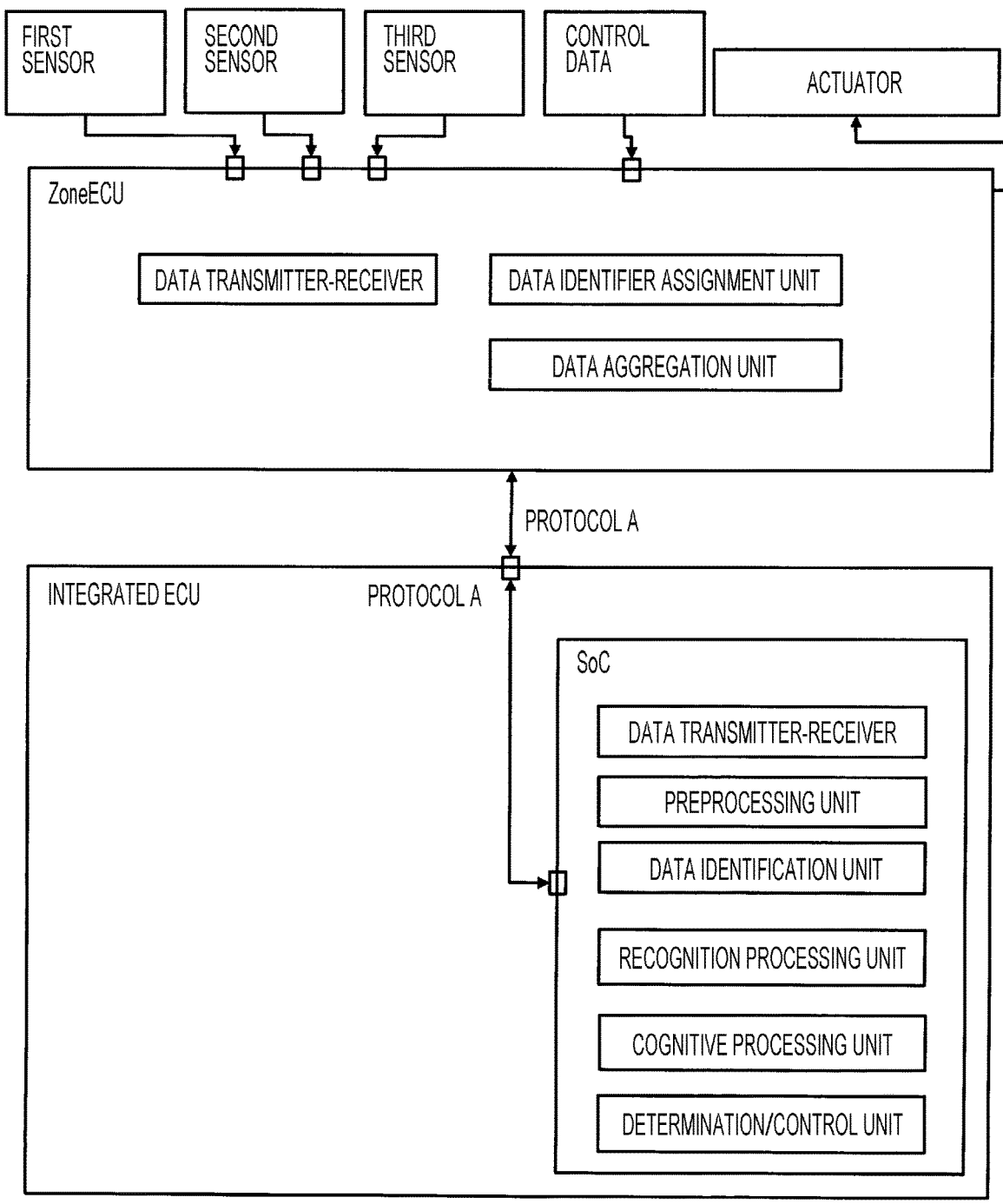
FIG. 2 is a block diagram illustrating the system configuration of a zone architecture.

Next, as a second comparative example with the present invention, an outline of the system configuration of a zone architecture will be described. FIG. 2 is a block diagram illustrating the system configuration of a zone architecture.

Since the integrated ECU receives all aggregated data via a single communication line, the communication load is high. In addition, since the data received by the integrated ECU contains data from different domains, the CPU load increases if the SoC in the integrated ECU identifies and separates the data. Furthermore, it is not possible to transmit sensor data from a camera or the like in accordance with a frame rate while giving priority to control data.

First Embodiment

Figure 3:
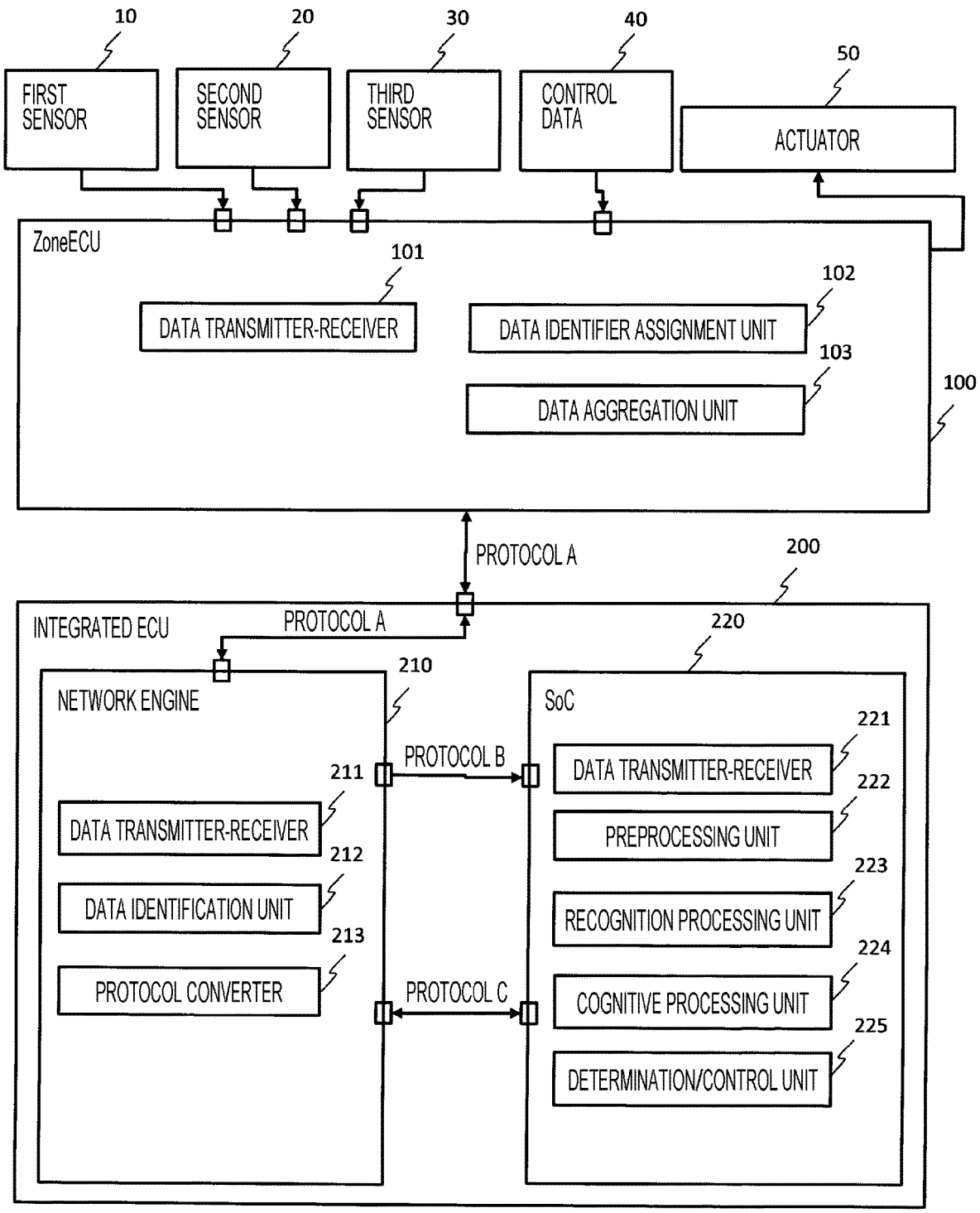
FIG. 3 is a configuration diagram of an in-vehicle system including an integrated ECU according to a first embodiment of the present invention.

FIG. 3 is a configuration diagram of an in-vehicle system including an integrated ECU 200 (vehicle control device) according to a first embodiment of the present invention. The in-vehicle system is mainly equipped with a zone ECU 100 and the integrated ECU 200.

The zone ECU 100 is connected to a first sensor (10), a second sensor (20), and a third sensor (30) via communication lines. Sensor data from each of the sensors is input to the zone ECU 100. The first sensor (10), the second sensor (20), and the third sensor (30) are various sensors that sense optional information, but in the present embodiment, at least one of the sensors is a camera.

Control data 40 is input to the zone ECU 100 via a communication line. The control data 40 is output from, for example, a sensor that senses information (steering amount or the like) used as an input for control of a chassis system or a power train system. The zone ECU 100 is connected to an actuator 50 via a control line. The actuator 50 is controlled by a control signal indicating a target control amount. The actuator 50 is controlled, for example, so that the control data 40 and the target control amount match.

The zone ECU 100 is equipped with a data transmitter-receiver 101, a data identifier assignment unit 102, and a data aggregation unit 103.

The data transmitter-receiver 101 transmits and receives data. The data aggregation unit 103 aggregates the sensor data from the first sensor (10), the second sensor (20), and the third sensor (30), and the control data 40. The data identifier assignment unit 102 assigns an identifier to the aggregated data. The data transmitter-receiver 101 transmits the aggregated data assigned with the identifier to the integrated ECU 200.

The integrated ECU 200 is equipped with a network engine 210 that is constituted by a field programmable gate array (FPGA) and an SoC 220 that is constituted by an integrated circuit. The network engine 210 is connected to the zone ECU 100 via the communication line of Protocol A. The network engine 210 is also connected to the SoC 220 via the communication lines of Protocol B and Protocol C. In the present embodiment, the Protocol A is Ethernet (FIG. 14A), the Protocol B is PCIe, MIPI-CSI2, or the like for camera data (FIG. 14B), and the Protocol C is CAN, SPI, or the like for control data (FIG. 14C).

The network engine 210 is equipped with a data transmitter-receiver 211, a data identification unit 212, and a protocol converter 213.

The data transmitter-receiver 211 transmits and receives data. Although details will be described later, the data identification unit 212 identifies the protocol of the communication interface of the SoC 220 that is the destination of the data received from the zone ECU 100. The protocol converter 213 converts the data received from the zone ECU 100 into data of the protocol of the communication interface of the SoC 220 that is the destination. The data transmitter-receiver 211 transmits the converted data to the SoC 220 via the communication interface (communication device, communication line, port, or the like) of the SoC 220 that is the destination.

The SoC 220 is equipped with a data transmitter-receiver 221, a preprocessing unit 222, a recognition processing unit 223, a cognitive processing unit 224, and a determination/control unit 225.

The data transmitter-receiver 221 transmits and receives data. As predetermined preprocessing, the preprocessing unit 222 removes noise from, for example, camera data received via the communication line of the Protocol B (PCIe, MIPI-CSI2, or the like) or control data received via the communication line of the Protocol C (CAN, SPI, or the like). The recognition processing unit 223 detects an object, such as a sign, from the camera data. The cognitive processing unit 224 recognizes information, such as speed limit, meant by the detected sign (object) or the like.

The determination/control unit 225 controls the vehicle, for example, so that the speed of the vehicle is within the recognized speed limit. That is, the determination/control unit 225 calculates the target control amount of the actuator from the control data (input data for control) received via the communication line of the Protocol C (CAN, SPI, or the like) and the information, such as the speed limit, recognized by the cognitive processing unit 224. The data transmitter-receiver 221 transmits a control signal indicating the target control amount to the network engine 210 via the communication line of Protocol C (CAN, SPI, or the like). The control signal is transmitted to the actuator 50 via the network engine 210 and the zone ECU 100.

Figure 4:
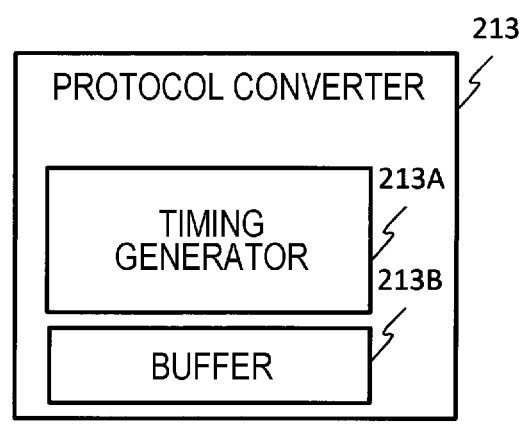
FIG. 4 is a configuration diagram of a protocol converter illustrated in FIG. 3.

FIG. 4 is a configuration diagram of the protocol converter 213 illustrated in FIG. 3. The protocol converter 213 is equipped with a timing generator 213A and a buffer 213B.

The timing generator 213A generates (notifies) timing for transferring camera data to the SoC 220 via the communication line of Protocol B (PCIe, MIPI-CSI2, or the like) at a predetermined period (for example, 40 ms) according to the frame rate of the camera. However, in a case where the control data is received, the timing generator 213A generates (notifies) the timing for transferring the control data on a highest priority basis via the communication line of Protocol C (CAN, SPI, or the like). The buffer 213B performs buffering to transfer camera data at a predetermined period.

In other words, the timing generator 213A of the network engine 210 generates the timing for transmitting vehicle control information (control data) to the integrated circuit (SoC 220 or SoC 230) in priority over the external recognition information (camera data) and the timing for periodically transmitting the external recognition information (camera data) to the integrated circuit. The buffer 213B of the network engine 210 buffers the external recognition information (camera data). Thus, the amount of communication from the network engine 210 to the integrated circuit (SoC 220 or SoC 230) can be controlled.

As described above, according to the present embodiment, it is possible to reduce the processor load of the integrated circuit (SoC) that processes the information aggregated in the zone architecture.

In the present embodiment, by changing information to the protocol corresponding to a dedicated interface mounted on the SoC and transmitting the information, it is possible to reduce software processing and CPU load. Furthermore, as a result, important control data can be processed by the CPU with low delay. The frame rate (fps) can be guaranteed by transferring sensor data, such as camera data, every certain period. As a result, the frame rate of the sensor data can be guaranteed.

Modification of First Embodiment

Figure 5:
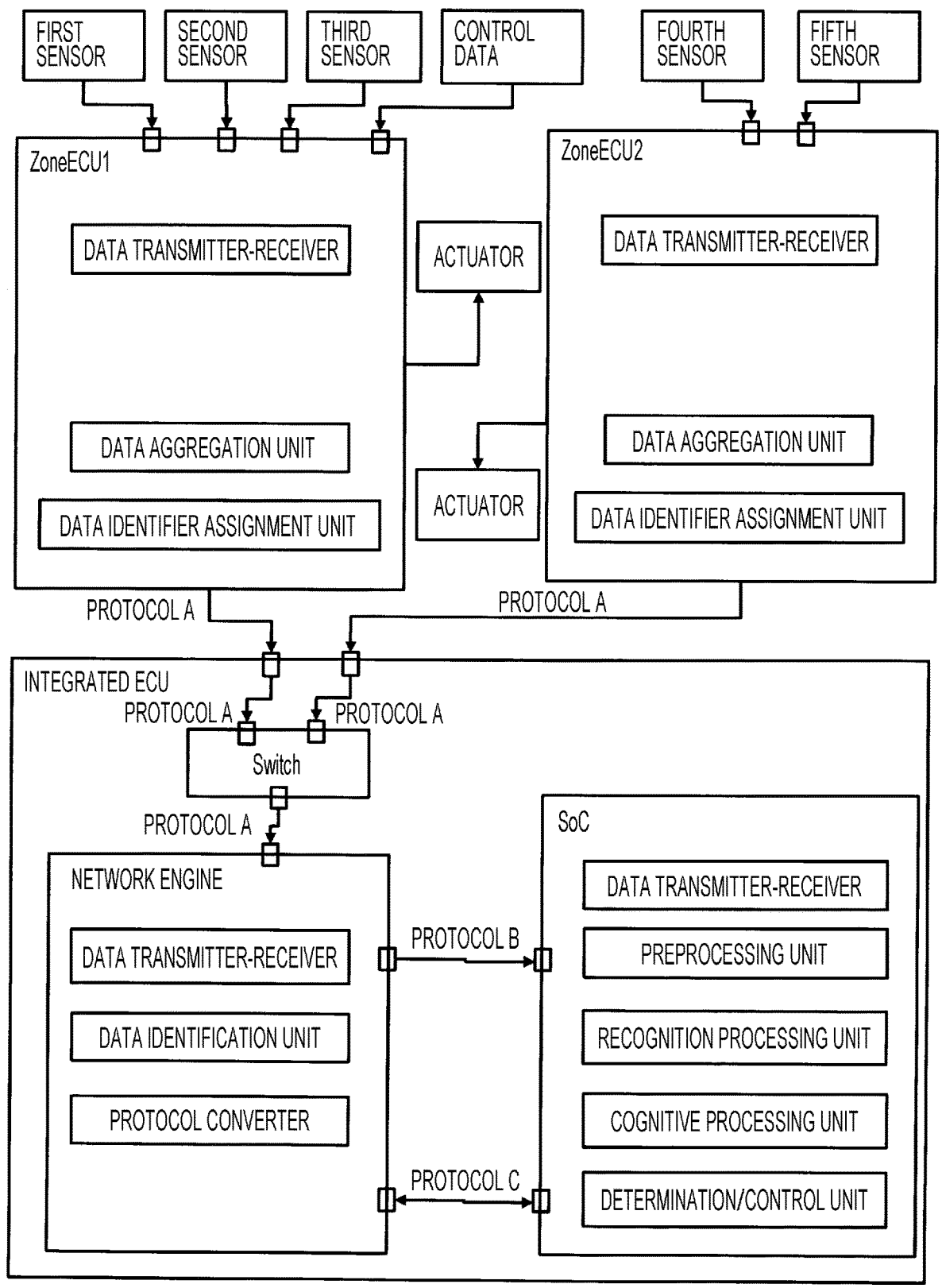
FIG. 5 is a configuration diagram of an in-vehicle system including an integrated ECU according to a modification of the first embodiment.

FIG. 5 is a configuration diagram of an in-vehicle system including an integrated ECU (vehicle control device) according to a modification of the first embodiment. As illustrated in FIG. 5, in order to input data from a plurality of zone ECUs to the network engine, the integrated ECU may incorporate a switch adapted to Protocol A (Ethernet).

Second Embodiment

Figure 6:
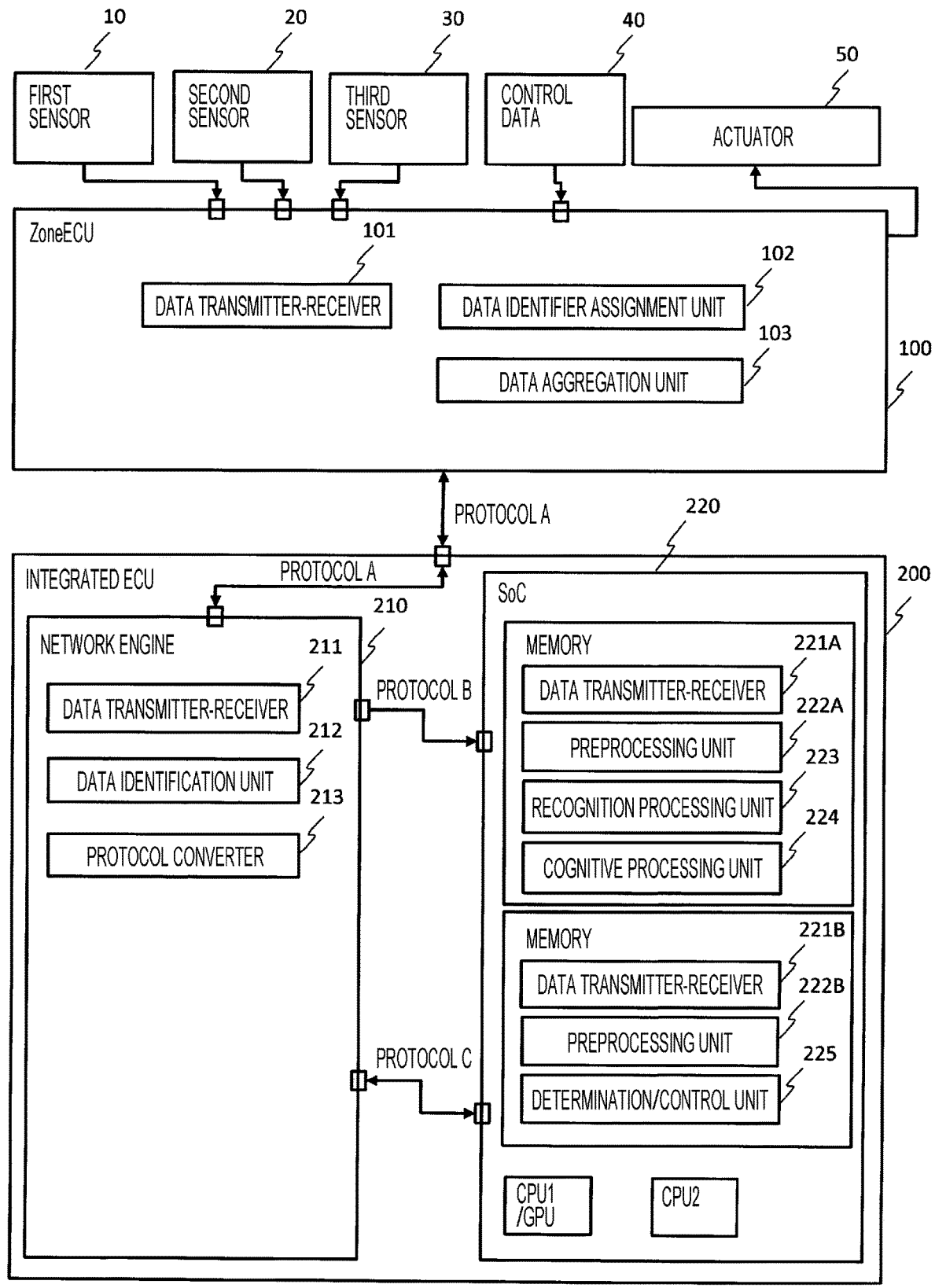
FIG. 6 is a configuration diagram of an in-vehicle system including an integrated ECU according to a second embodiment of the present invention.

FIG. 6 is a configuration diagram of an in-vehicle system including the integrated ECU 200 (vehicle control device) according to a second embodiment of the present invention. The SoC 220 according to the present embodiment is equipped with hardware resources (memory, CPU) for each communication interface.

A CPU 1/GPU of the SoC 220 processes the camera data received via the communication line of Protocol B (PCIe, MIPI-CSI2, or the like). In other words, the camera data (camera image) is input to the Vision processing chip or accelerator. Note that the CPU 1/GPU functions as a data transmitter-receiver 221A, a preprocessing unit 222A, the recognition processing unit 223, and the cognitive processing unit 224 in cooperation with a memory for camera data.

A CPU 2 of the SoC 220 processes the control data received via the communication line of Protocol C (CAN, SPI, or the like), and performs integrated control of a power train system, a chassis system, a body system, and the like. Note that the CPU 2 functions as a data transmitter-receiver 221B, a preprocessing unit 222B, and the determination/control unit 225 in cooperation with a memory for control data.

Third Embodiment

Figure 7:
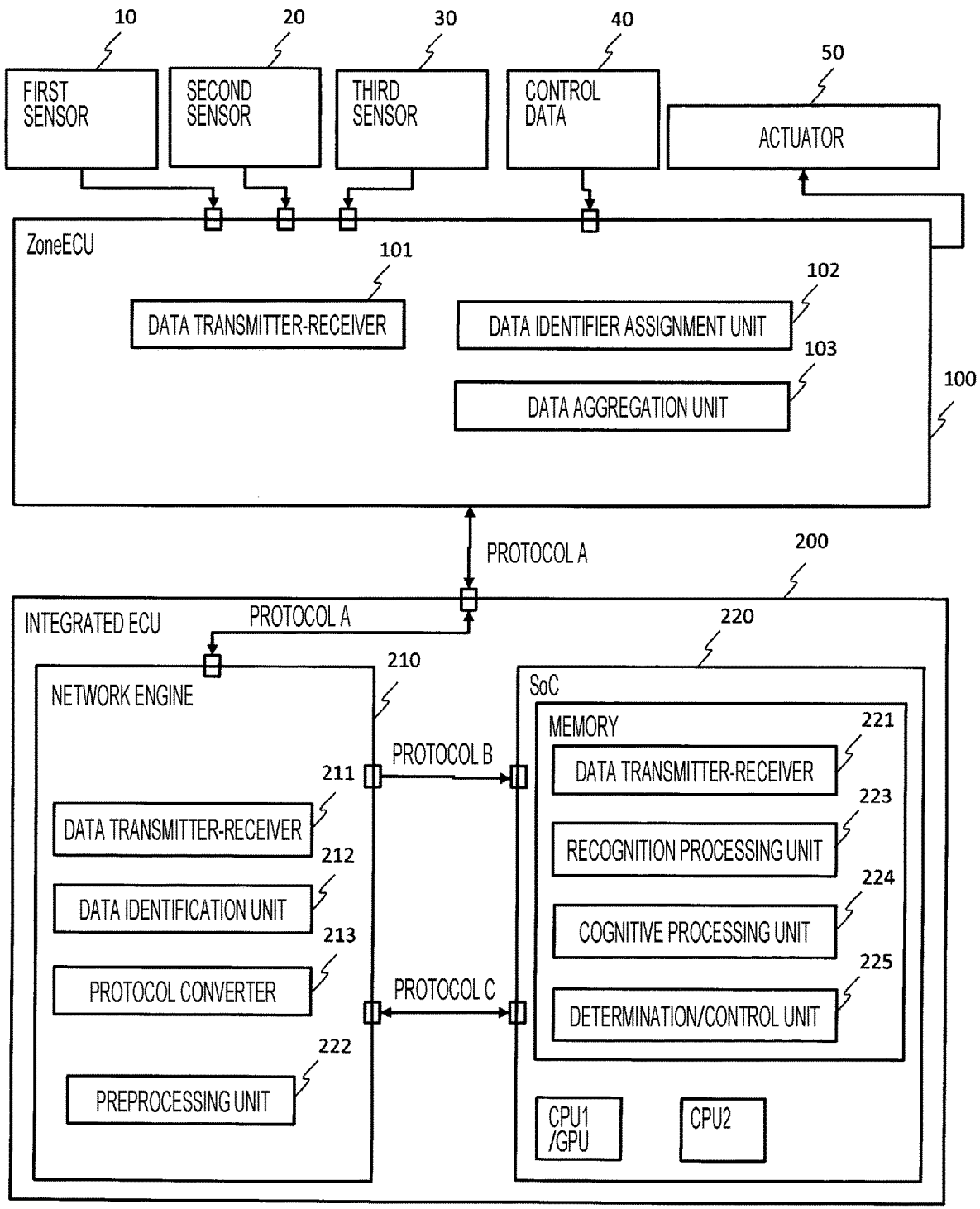
FIG. 7 is a configuration diagram of an in-vehicle system including an integrated ECU according to a third embodiment of the present invention.

FIG. 7 is a configuration diagram of an in-vehicle system including the integrated ECU 200 (vehicle control device) according to a third embodiment of the present invention. In the present embodiment, the preprocessing unit 222 is provided not in the SoC 220 but in the network engine 210.

By performing preprocessing related to the camera data (image data) and the control data in the network engine 210, the processing load on the SoC 220 side can be reduced.

Fourth Embodiment

Figure 8:
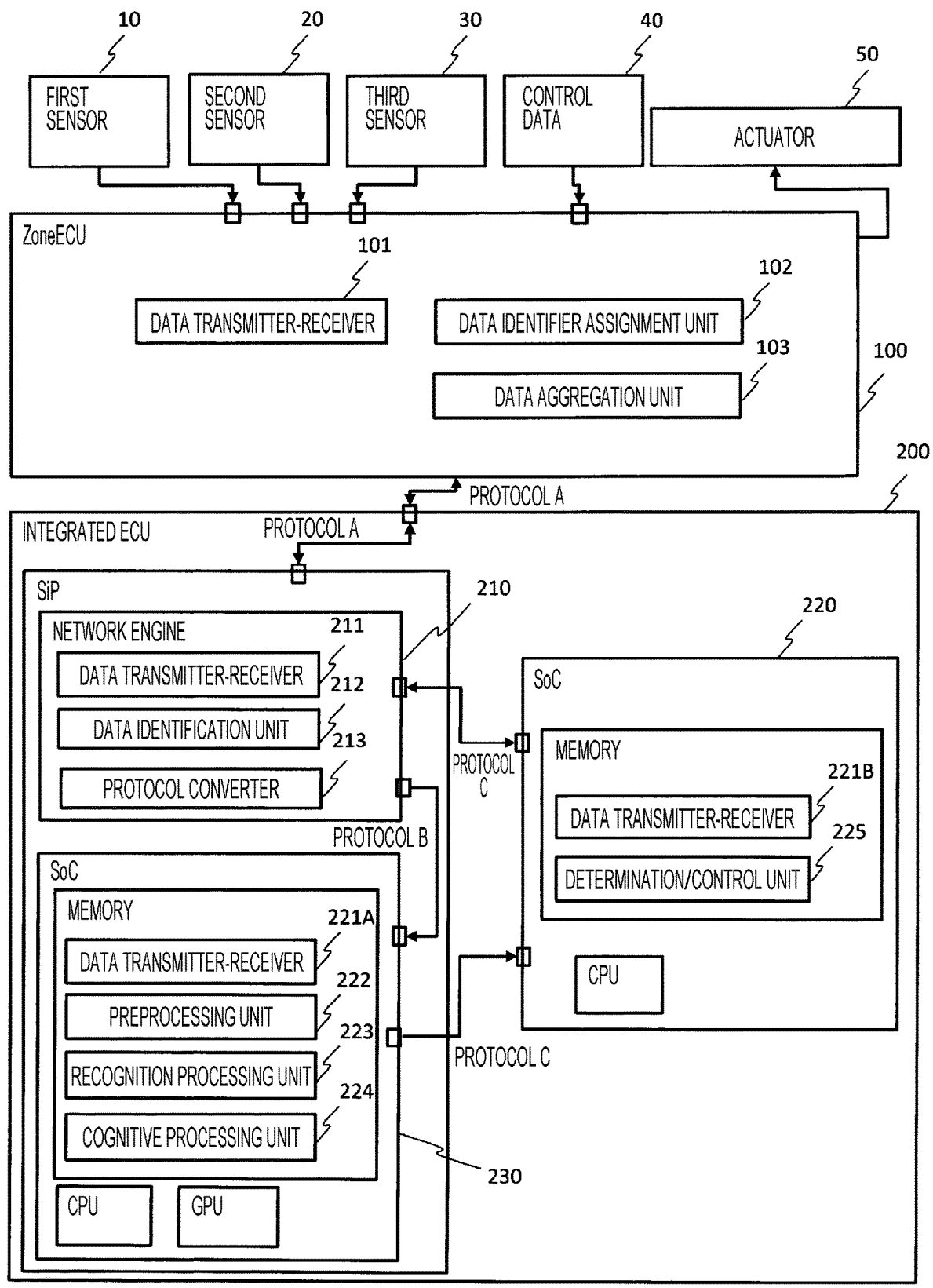
FIG. 8 is a configuration diagram of an in-vehicle system including an integrated ECU according to a fourth embodiment of the present invention.

FIG. 8 is a configuration diagram of an in-vehicle system including the integrated ECU 200 (vehicle control device) according to a fourth embodiment of the present invention. In the present embodiment, the integrated ECU 200 is equipped with a system in package (SiP).

The SiP includes the network engine 210 constituted by the FPGA and the SoC 230 for camera data. The CPU or GPU of the SoC 230 performs image processing, AI processing, or the like on the camera data. Note that the CPU or GPU of the SoC 230 functions as the data transmitter-receiver 221A, the preprocessing unit 222, the recognition processing unit 223, and the cognitive processing unit 224 in cooperation with the memory of the SoC 230.

Fifth Embodiment

Figure 9:
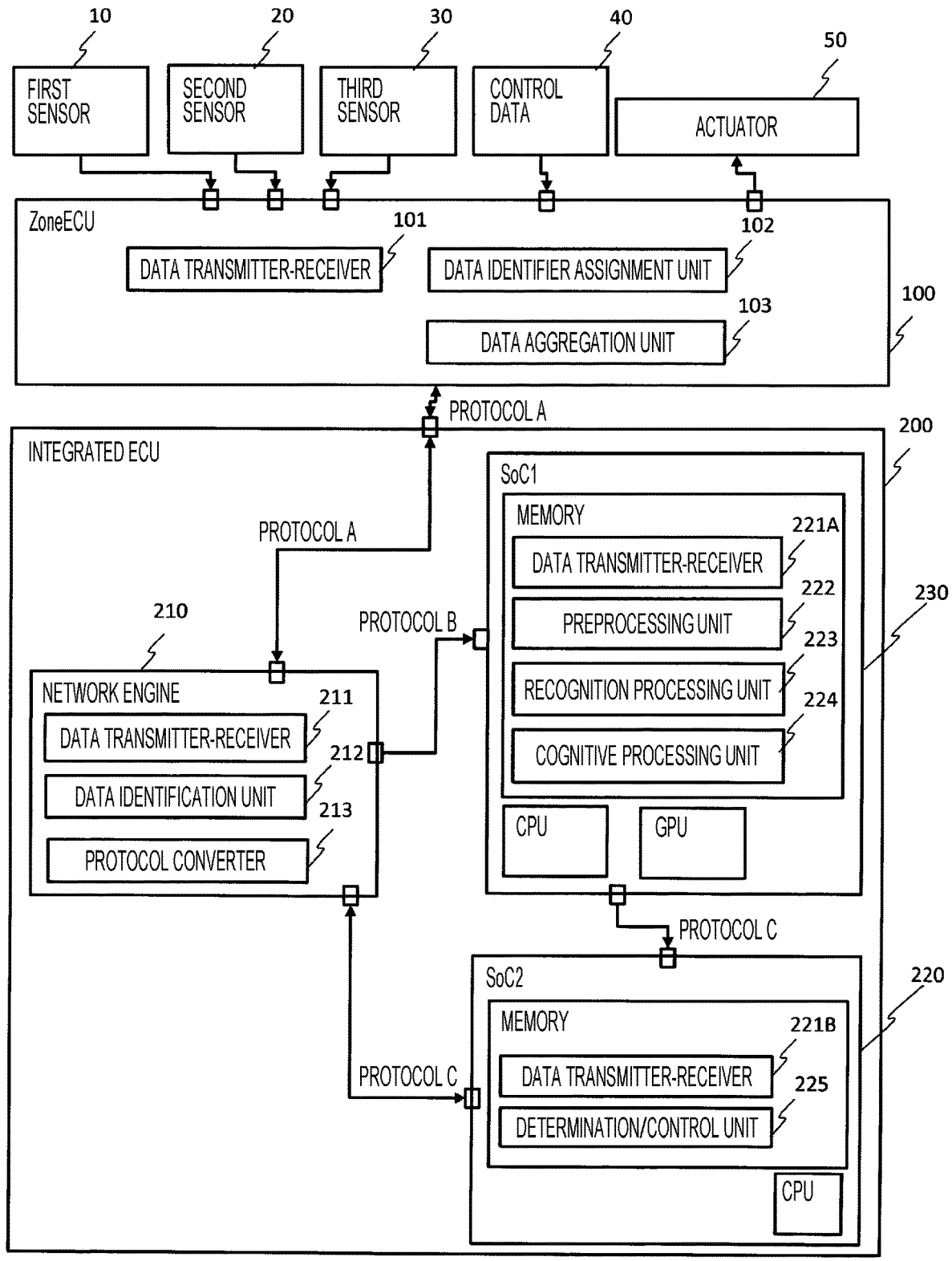
FIG. 9 is a configuration diagram of an in-vehicle system including an integrated ECU according to a fifth embodiment of the present invention.

FIG. 9 is a configuration diagram of an in-vehicle system including the integrated ECU 200 (vehicle control device) according to a fifth embodiment of the present invention. In the present embodiment, the integrated ECU 200 is equipped with the SoC 220 and the SoC 230 that are different for each communication interface of the output destination of the network engine 210.

Sixth Embodiment

Figure 10:
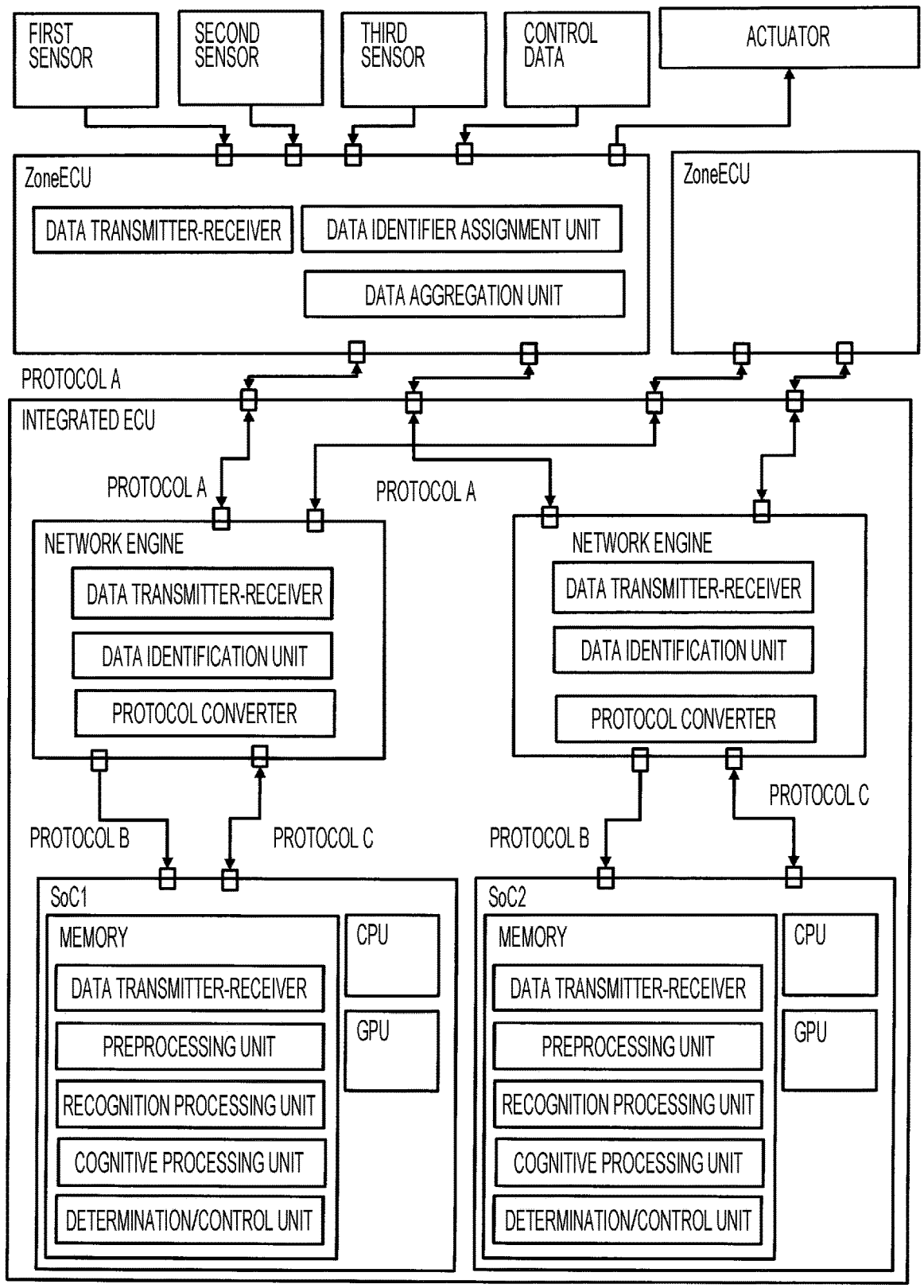
FIG. 10 is a configuration diagram of an in-vehicle system including an integrated ECU according to a sixth embodiment of the present invention.

FIG. 10 is a configuration diagram of an in-vehicle system including an integrated ECU (vehicle control device) according to a sixth embodiment of the present invention. The integrated ECU according to the present embodiment is equipped with a processing system with two systems each configured from a network engine and an SoC.

With the redundant configuration, even if the network engine or SoC of one system fails, the control data can be reliably processed by the other system.

Seventh Embodiment

Figure 11:
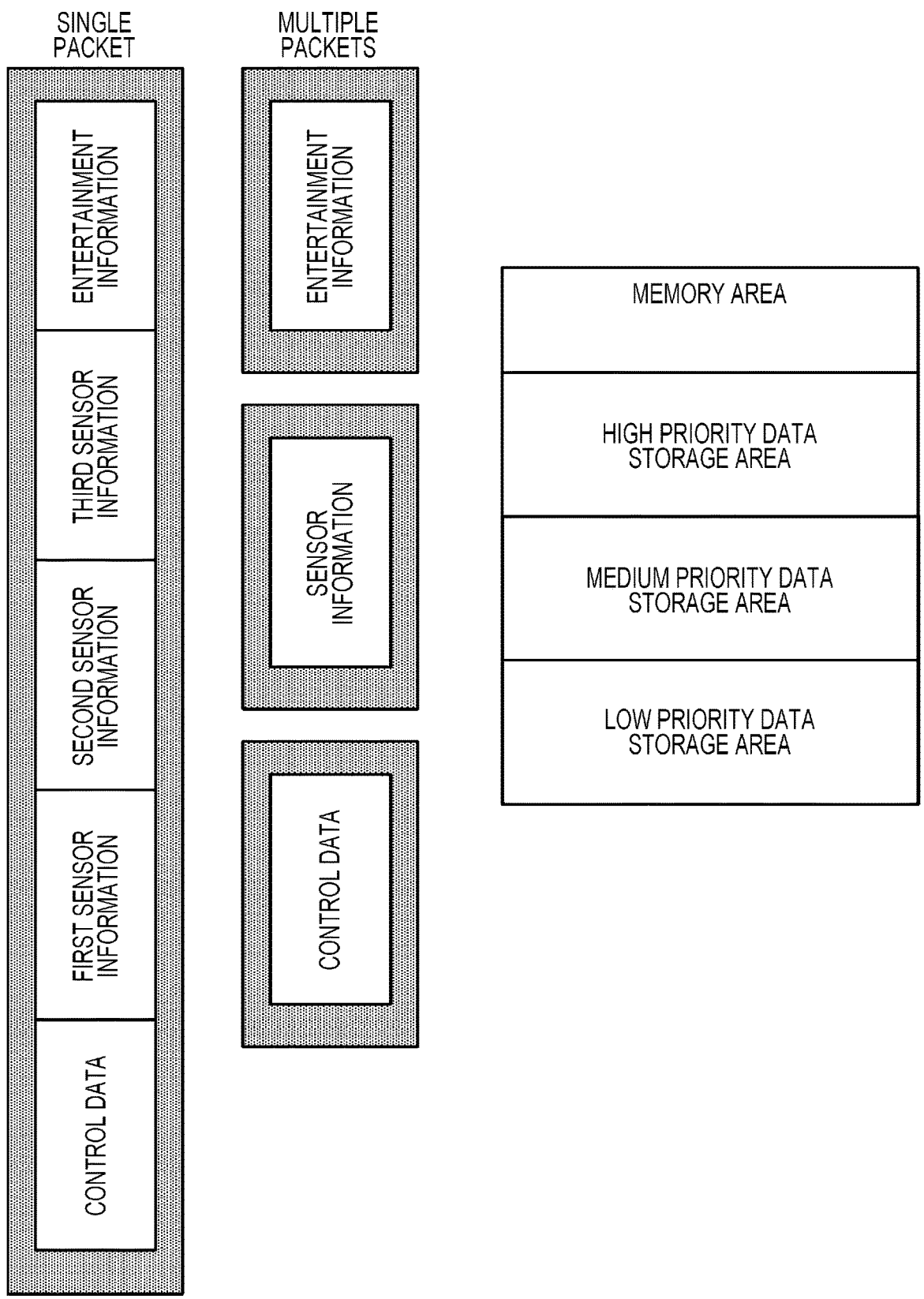
FIG. 11 is an explanatory diagram of data used in an in-vehicle system including an integrated ECU according to a seventh embodiment of the present invention.

FIG. 11 is an explanatory diagram of data used in an in-vehicle system including an integrated ECU (vehicle control device) according to a seventh embodiment of the present invention. Note that the configuration of the in-vehicle system may be any configuration of the first to sixth embodiments. In the present embodiment, the zone ECU 100 aggregates a plurality items of information and transmits the aggregated items of information as a single packet to the network engine 210 of the integrated ECU 200.

Specifically, when aggregating a plurality items of information into a single packet, the data aggregation unit 103 of the zone ECU 100 rearranges the items of information (data) in order of priority. The priority is higher in order (descending order) of control data, sensor information, and entertainment information (hereafter referred to as "entertainment information"). That is, the priority of the control data is the highest, and the priority of the entertainment information is the lowest.

Note that the information items contained in the data (packet) should be arranged in order of priority, and the order of priority may be descending order or ascending order. In addition, the priority may be increased in the order (descending order) of chassis system information, powertrain system information, autonomous driving system information, body system information, and infotainment system information.

The data transmitter-receiver 211 of the network engine 210 receives a packet from the zone ECU 100. Each information item contained in the received packet is stored in the memory area of the network engine 210 according to priority.

The data transmitter-receiver 211 of the network engine 210 transmits the information (data) stored in the memory area to the SoC 220 or the SoC 230 according to the timing generated by the timing generator 213A.

In other words, the network engine 210 transmits the information (control data, camera data, and the like) to the integrated circuit (SoC 220 or SoC 230) in descending order of priority. Thus, the information aggregated in the zone architecture can be transmitted to the integrated circuit (the SoC 220 or the SoC 230) according to priority.

In the present embodiment, the zone ECU 100 transmits the plurality of aggregated information items as a single packet, but may transmit the aggregated information items as a plurality of packets in descending order of priority. Note that the source address of each information item is added to the packet.

(Identification and Sorting of Data)

Figure 12:
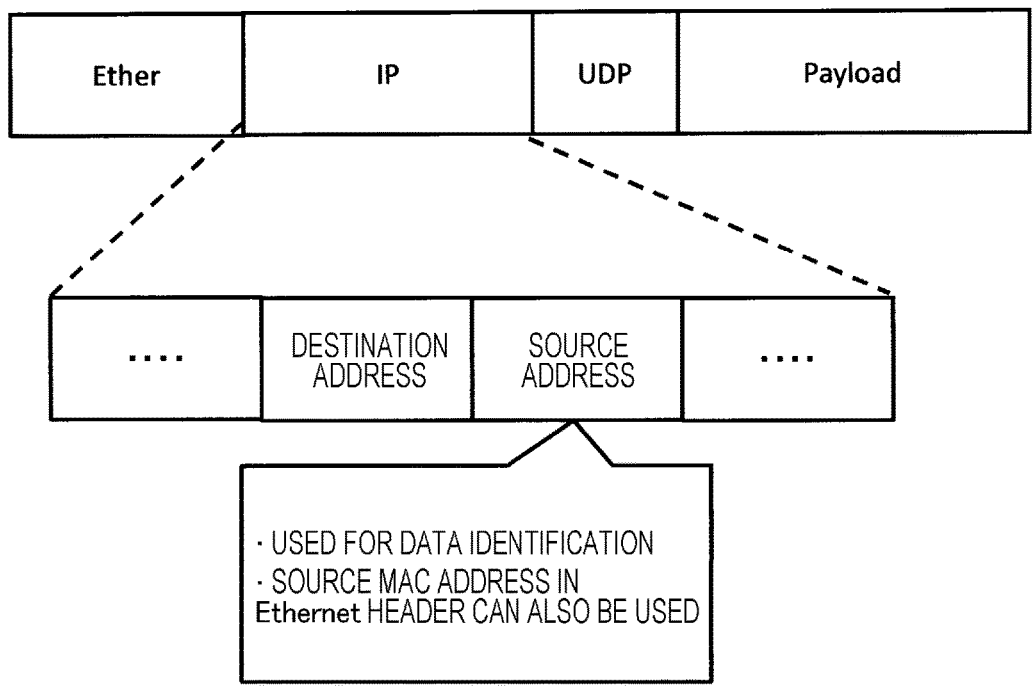
FIG. 12A is an explanatory diagram of data received by a network engine of the integrated ECU from a zone ECU.
FIG. 12B is an explanatory diagram of a table used by the network engine to identify or sort data.

FIG. 12A is an explanatory diagram of data received by the network engine 210 of the integrated ECU 200 from the zone ECU 100.

The data received by the network engine 210 is configured from a header (Ether, IP, UDP) according to Protocol A (Ethernet), a payload which is an entity of data, and the like. The IP header includes a destination address, a source address, and the like. In the present embodiment, the network engine 210 uses the source address of the IP header for data identification, but the source address contained in the Ethernet header may also be used.

FIG. 12B is an explanatory diagram of a table 214 used by the network engine 210 to identify or sort data. The table 214 associates each source address with an output protocol, which indicates the protocol of the communication interface of the SoC 220 that is the destination, and stores the result.

The data identification unit 212 of the network engine 210 reads the output protocol corresponding to the source address of the IP header from the table 214. For example, the output protocol corresponding to a source address (source IP) of 192.168.0.1 is PCIe, and the received data is identified (determined) to be camera data. In the present embodiment, the output protocol is associated with the type of data, but the source address (source IP) may be associated with the type of data.

Note that in the present embodiment, an IP address is used as the source address, but a MAC address or a virtual local area network (VLAN) address may be used. In addition, the source address may be incorporated in the Payload.

(Output Frame)

FIG. 13 is an explanatory diagram of data (input data frame) input to the network engine 210 and data (output frame) output from the network engine 210.

If the data input to the network engine 210 is sensor data, the output frame is obtained by removing a header (Ether, IP, UDP) from the input data frame. Furthermore, if the data input to the network engine 210 is control data, the output frame is obtained by removing the header (Ether, IP, UDP) from the input data frame and adding the header (CAN, SPI, etc.) of the output protocol. However, the Ether header, the IP header, and the UDP header of the output frame of the control data may be added after the Payload.

(Operation of Network Engine)

Figure 15:
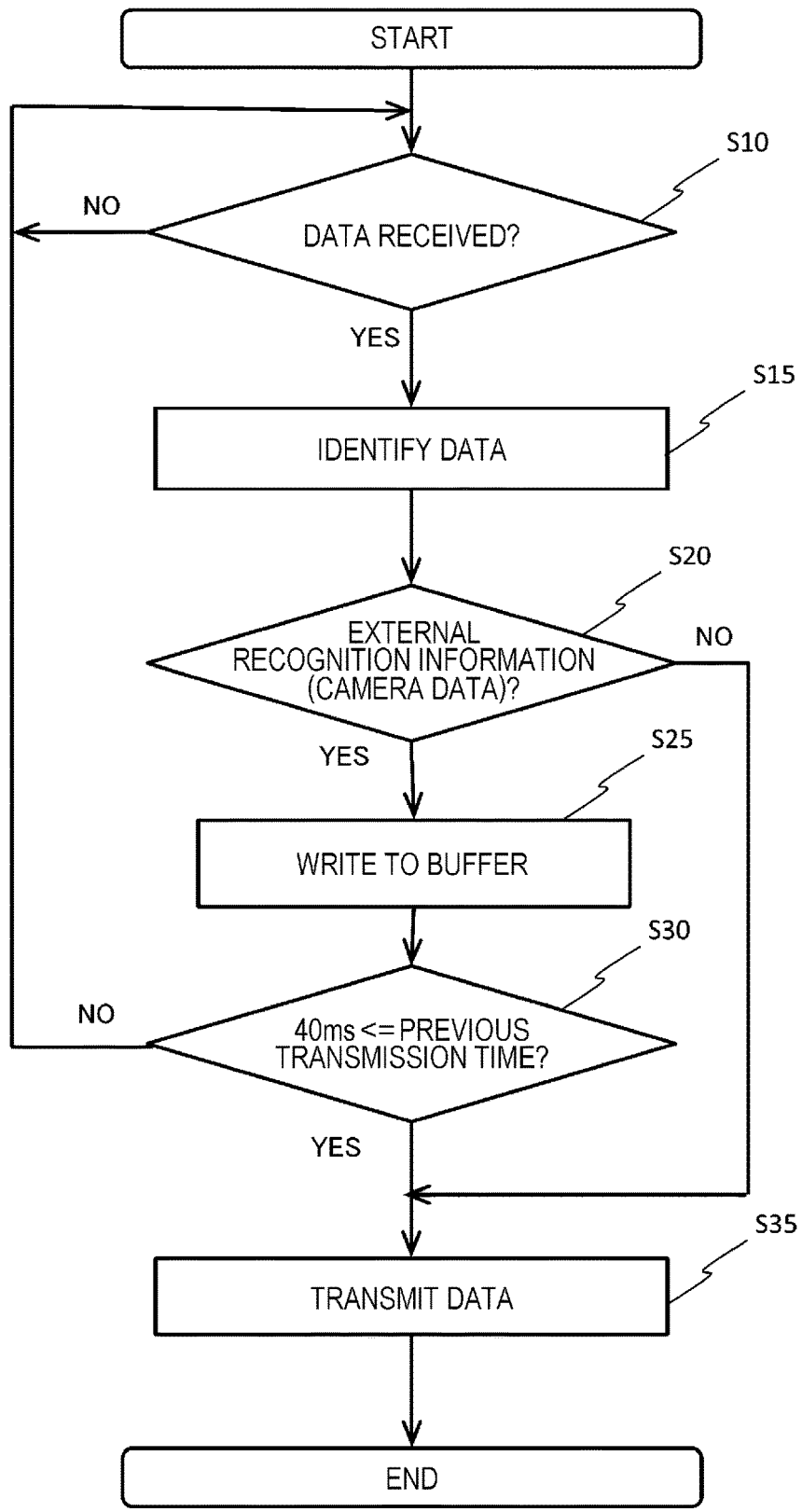
FIG. 15 is a flowchart illustrating the processing of the network engine.

FIG. 15 is a flowchart illustrating the processing of the network engine 210.

Upon receiving data from the zone ECU 100 (S10: YES), the network engine 210 identifies the received data (S15).

Specifically, the network engine 210 receives data (packet) containing a plurality of pairs of the information (control data, camera data, and the like) and its source address according to a first communication protocol (Protocol A). The network engine 210 identifies the communication protocol (Protocol B, C) of the communication interface of the destination integrated circuit (SoC 220 or SoC 230) corresponding to the source address of each item of the information.

The network engine 210 identifies, from the communication protocol (Protocol B, C) of the communication interface of the destination integrated circuit (the SoC 220 or the SoC 230) corresponding to the source address of each item of the information (control data, camera data, and the like), whether each information item is vehicle control information (control data) indicating information used to control the vehicle or external recognition information (camera data) indicating information recognized about the external environment of the vehicle. Thus, the type of information aggregated in the zone architecture can be identified.

If the identified data is camera data (S20: YES), the network engine 210 writes the camera data to the buffer 213B (S25). Note that the condition of YES in S20 is not limited to that the identified data is the camera data (external recognition information), and may be other sensor data other than the control data.

The network engine 210 transmits the camera data stored in the buffer 213B to the SoC 220, at every predetermined period (for example, 40 ms) (S30: YES) according to the frame rate of the camera (S35). Meanwhile, if the identified data is control data (S20: NO), the network engine 210 transmits the control data to the SoC 220 (S35).

In other words, the network engine 210 sorts the information (control data, camera data, and the like) for each identified communication protocol (Protocol B, C), converts the sorted information into data of the identified communication protocol, and transmits each converted item of the data to the destination integrated circuit via the communication interface (Protocol B, C) of the destination integrated circuit (SoC 220 or SoC 230). Thus, the information aggregated in the zone architecture can be sorted and the sorted information can be transmitted to the destination integrated circuit (SoC 220 or SoC 230).

The network engine 210 transmits the vehicle control information (control data) to the integrated circuit (SoC 220 or SoC 230) in priority over the external recognition information (camera data). Thus, the vehicle can be controlled with low delay.

The communication protocol (Protocol B, C) of the communication interface of the destination integrated circuit (the SoC 220 or the SoC 230) corresponding to the source address of each item of the information (control data, camera data, and the like) is different from the first communication protocol (Protocol A). Specifically, the communication speed of the first communication protocol (Protocol A) is higher than the communication speed of the communication protocol (Protocol B, C) of the communication interface of the destination integrated circuit (the SoC 220 or the SoC 230) corresponding to the source address of each item of the information. Thus, the information aggregated in the zone architecture can be transmitted at high speed from the zone ECU 100 to the integrated ECU 200.

The embodiments of the present invention may have the following aspects.

(1) A vehicle control device including a second device (network engine 210) that uses a first communication method (Protocol A) to receive first information containing vehicle control information (control data 40) and vehicle external recognition information (camera data, point cloud data, and the like) transmitted by a first device (zone ECU 100), separates the first information for each information item to be transmitted to different domains (different protocol destinations), and transmits the separated information to a client (SoC 220) that performs calculation, wherein the second device is equipped with a protocol converter (213) that selects a method (protocol) of transmission to the client according to the information and converts the transmission protocol of the information according to the selected transmission method.

(2) The vehicle control device according to (1), in which the protocol converter (213) converts the protocol into a communication method (Protocol B, C) different from the first communication method (Protocol A).

(3) The vehicle control device according to (2), in which the first communication method (Protocol A) is faster in data transfer than the different communication method (Protocol B, C).

(4) The vehicle control device according to (1), in which the second device (network engine 210) has a data source identification unit (data identification unit 212) that identifies whether the first information is the vehicle control information (control data 40) or the external recognition information (camera data).

(5) The vehicle control device according to (1), in which the second device (network engine 210) transmits the vehicle control information (control data 40) to the client (SoC 220) in priority over the external recognition information (camera data).

(6) The vehicle control device according to (1), in which the protocol converter (213) is equipped with a buffering unit (buffer 213B) for periodically transmitting, to the client (SoC 220), the external recognition information (camera data) among the first information received from the first device (zone ECU 100), and a timing generator (213A) that generates timing of transfer to the client.

Note that the present invention is not limited to the above-described embodiments, and includes various modifications. For example, the above-described embodiments have been described in detail in order to describe the present invention in an easy-to-understand manner, and are not necessarily limited to those equipped with all the described configurations. In addition, a part of the configuration of one embodiment can be replaced with the configuration of another embodiment, and the configuration of another embodiment can also be added to the configuration of one embodiment. In addition, it is possible to add, delete, and replace some of the configurations of the embodiments with other configurations.

In addition, some or all of the above-described configurations, functions, and the like may be implemented by hardware by designing them, for example, with an integrated circuit.

In addition, each of the above-described configurations, functions, and the like may be implemented by software by a processor interpreting and executing a program for implementing each function. Information such as a program, a table, and a file for implementing each function can be stored in a memory, a recording device such as a hard disk or a solid state drive (SSD), or a recording medium such as an IC card, an SD card, or a DVD.

REFERENCE SIGNS LIST

10 sensor
20 sensor
30 sensor
40 control data
50 actuator
100 zone ECU
101 data transmitter-receiver
102 data identifier assignment unit
103 data aggregation unit
210 network engine
211 data transmitter-receiver
212 data identification unit
213 protocol converter
213A timing generator
213B buffer
214 table
221 data transmitter-receiver
221A data transmitter-receiver
221B data transmitter-receiver
222 preprocessing unit
222A preprocessing unit
222B preprocessing unit
223 recognition processing unit
224 cognitive processing unit
225 determination/control unit

The invention claimed is:

1. A vehicle control device, comprising:

at least one integrated circuit that processes information; and a network engine equipped with a timing generator to generate timing for transmitting vehicle control information to the integrated circuit in priority over external recognition information and timing for periodically transmitting the external recognition information to the integrated circuit, and a buffer to buffer the external recognition information, the network engine configured to:

receive data containing a plurality of pairs of the information and a source address of the information according to a first communication protocol, identify a communication protocol of a communication interface of a destination integrated circuit corresponding to the source address of each item of the information, identify, from the communication protocol of the communication interface of the destination integrated circuit corresponding to the source address of each item of the information, whether each item of the information is vehicle control information indicating information used to control a vehicle or external recognition information indicating information recognized about an external environment of the vehicle, sort the information for each identified communication protocol, convert the sorted information into data of the identified communication protocol, transmit each converted data item to the destination integrated circuit via the communication interface of the destination integrated circuit, and transmit the vehicle control information to the integrated circuit in priority over the external recognition information.

2. The vehicle control device according to claim 1, wherein the communication protocol of the communication interface of the destination integrated circuit corresponding to the source address of each item of the information is different from the first communication protocol.

3. The vehicle control device according to claim 2, wherein a communication speed of the first communication protocol is higher than a communication speed of the communication protocol of the communication interface of the destination integrated circuit corresponding to the source address of each item of the information.

4. The vehicle control device according to claim 1, wherein
the information contained in the data is arranged in order of priority, and
the network engine transmits the information to the integrated circuit in descending order of priority.

* * * * *